United States Patent [19]
Hahn

[11] Patent Number: 4,963,026
[45] Date of Patent: Oct. 16, 1990

[54] CAVITY LENGTH CONTROL APPARATUS FOR A MULTI-OSCILLATOR

[75] Inventor: Tae W. Hahn, North Hollywood, Calif.

[73] Assignee: Litton Systems, Inc., Beverly Hills, Calif.

[21] Appl. No.: 167,512

[22] Filed: Mar. 14, 1988

[51] Int. Cl.$^5$ ............................................. G01C 19/64
[52] U.S. Cl. .................................................. 356/350
[58] Field of Search ........................... 356/350; 372/94

[56] References Cited

U.S. PATENT DOCUMENTS

| | | |
|---|---|---|
| 3,937,578 | 2/1976 | Andringa. |
| 4,006,989 | 2/1977 | Andringa. |
| 4,123,162 | 10/1978 | Sanders ............................... 356/350 |
| 4,152,071 | 5/1979 | Podgorski ............................ 356/350 |
| 4,652,132 | 3/1987 | Nelson et al. ........................ 356/350 |

FOREIGN PATENT DOCUMENTS 2800332  7/1978  Fed. Rep. of Germany.

Primary Examiner—Vincent P. McGraw
Assistant Examiner—S. A. Turner
Attorney, Agent, or Firm—Elliott N. Kramsky

[57] ABSTRACT

An apparatus and method for controlling the length of a multioscillator cavity. A photodiode mixes a pair of beams rotating in the same direction, one of said beams being substantially left circularly polarized, and the other beam being substantially right circularly polarized. A local oscillator causes the mixed beams to be modulated. An amplitude demodulator demodulates the modulated beams. An error detecting device responds to the amplitude demodulators, and an active integrator integrates the detected error. A piezotransducer responds to the output of the integrator for controlling the length of the multioscillator cavity.

16 Claims, 2 Drawing Sheets

CAVITY LENGTH CONTROL APPARATUS FOR A MULTI-OSCILLATOR

BACKGROUND

1. Field of the Invention

The present invention relates to inertial sensors. More particularly, this invention pertains to an improved apparatus for controlling the cavity length of multioscillator mode ring laser gyroscopes and accelerometers.

2. Description of the Prior Art

Multi-oscillators have been proposed as means for overcoming the "lock-in" problem in ring laser gyroscopes. In essence, the multioscillator operates as a pair of two-mode ring laser gyroscopes that share a single cavity. The multioscillator light cavity sustains a substantially left circularly polarized (LCP) beam pair, comprising one beam propagating in the clockwise direction and the other in the counter-clockwise (anticlockwise) direction having angular frequencies $w_{LC}$ and $w_{LA}$ respectively. Similarly, the multioscillator light cavity further sustains a substantially right circularly polarized (RCP) beam pair also comprised of counter-propagating beams having angular frequencies $w_{RC}$ and $w_{RA}$. Ideally, each beam pair acts independently as a two-mode ring laser gyroscope and senses body rotation by means of the Sagnac effect.

In order to achieve independent operation of these two gyroscopes within the same cavity, a means is applied to the cavity to ensure that the two beam pairs, one pair of LCP light and the other of RCP light, operate about different frequencies. This separation of frequencies is known as "reciprocal splitting" and is typically in the order of a few hundreds MHz. Early multioscillator designs achieved the necessary reciprocal splitting by the placement of a suitably aligned optically active element in a three- or four-mirrored cavity.

With the reciprocal splitting technique in operation, the two groups of the multioscillator configuration can operate independently, but each will still be subject to the lock-in phenomenon. Unlike the mechanically dithered gyro in which an "a.c." bias is applied via the dither, the multioscillator circumvents this problem by applying a "d.c." bias to the two gyros so that each operates about a point far removed from the "dead band" where the gyros give no output. This bias is known as "nonreciprocal splitting" and is accomplished by introducing a Faraday rotation into the cavity.

When circularly polarized light passes through a Faraday rotator, it experiences a phase shift that depends upon the direction of propagation through the rotator. In such a manner, the clockwise and counter-clockwise beams of each gyro experience different phase shifts and thus lase at different frequencies. Typical values for the nonreciprocal splitting in a multioscillator are much smaller (about 1 MHz) than the reciprocal splitting.

Nonreciprocal splitting can generally be achieved by the use of an intracavity element, made of suitable glass, mounted within an axial magnetic field, or by surrounding the gaseous gain medium of the cavity by an axial magnetic field.

When nonreciprocal splitting is applied to the multioscillator in the prescribed manner, the resulting bias shift in the left circularly polarized gyro is equal but opposite in sign to the bias shift in the right circularly polarized gyro. Thus, when the outputs of the two gyros are summed, the resultant signal is doubly sensitive to body rotation but independent of the magnitude of the applied bias. In this way, the differential nature of the multioscillator makes it inherently insensitive to bias variations that can be caused, for example, by changes in magnetic field, temperature or the like, which have proven to be a major problem in single gyro, two-mode designs that utilize a d.c. bias.

It is well known that the cavity length of nonplanar ring laser gyroscopes or accelerometers is inherently sensitive to changes in temperature, pressure and like factors. Several unsuccessful attempts have been made to select stable materials for use in the manufacture of the instrument block frame of such sensors. Therefore, multioscillators have been proposed as means for controlling the cavity length of inertial sensors, and particularly nonplanar inertial sensors.

The use of multioscillators has not proven to be completely satisfactory, in that this attempted solution generally relies on the use of relatively expensive optical instruments, sensors and polarizers at the output of one or more partially transmissive mirror. Furthermore, in addition to their relatively high cost, the optical polarizers and instruments are relatively unstable and, therefore, introduce other sources of errors. Another factor that has substantially contributed to the inaccuracy of such an attempt is the fact that while the s- and p-mode polarizations of the light beams are differentiable inside their lasing cavity, they may not be distinctly differentiable at the output of the exit mirror.

SUMMARY AND OBJECTS OF THE INVENTION

The foregoing shortcomings of present-day ring laser gyroscope and accelerometer designs are addressed and overcome by the present invention. In this regard, the present invention provides an apparatus for controlling the length of a multioscillator cavity which sustains a substantially left circularly polarized beam pair, including two counter-rotating beams, and a substantially right circular polarized beam pair, including two counter-rotating beams. The inventive control apparatus comprises a photodiode for mixing a pair of beams rotating in the same direction. One of the beams is substantially left circularly polarized, and the other beam is substantially right circularly polarized.

A local oscillator causes the mixed beams to be modulated, while an amplitude demodulator demodulates the modulated beams. An error detecting device responds to the amplitude demodulator, and an active integrator integrates the detected error. A piezotransducer responds to the output of the integrator for controlling the length of the multioscillator cavity.

The foregoing, and additional features and advantages of the present invention will become further apparent from the detailed description that follows. The written description is accompanied by a set of drawing figures. Numerals of the figures correspond to those of the written description, like numerals referring to like features of this invention throughout both.

DETAILED DESCRIPTION

Figure 1:
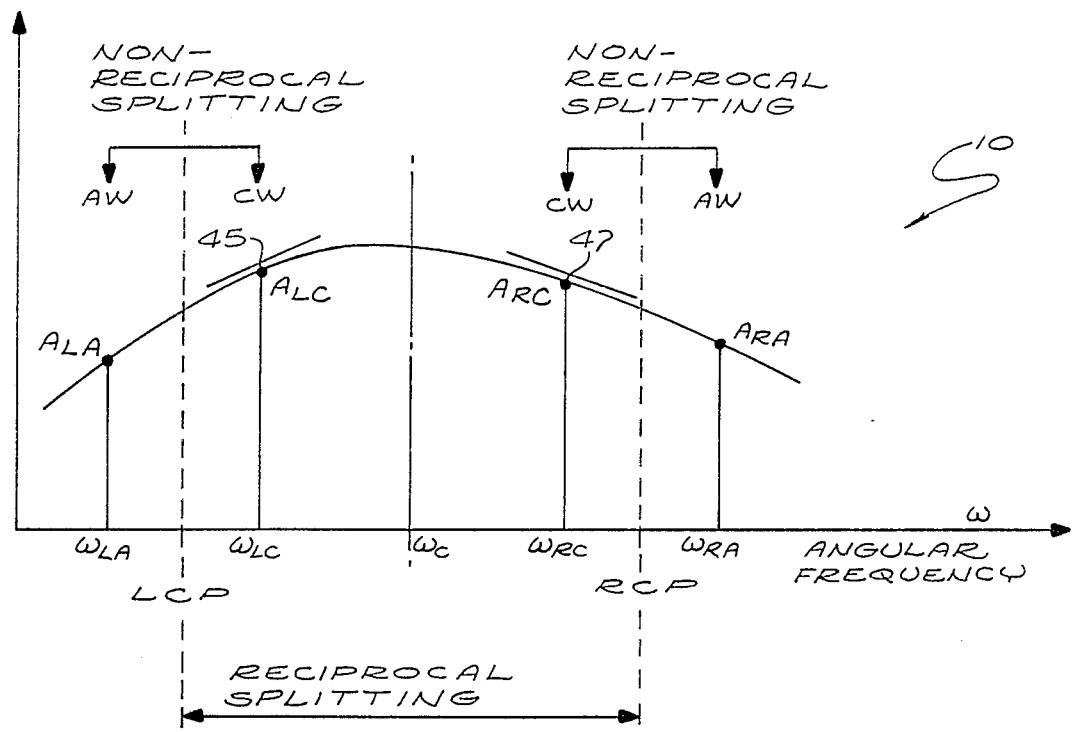
FIG. 1 is a graphical representation of the operating characteristics of a four-mode multioscillator.

Turning now to the drawings, FIG. 1 is a graphical representation of the power gain curve 10 of a multioscillation mode inertial sensor such as a ring laser gyroscope, a ring laser accelerometer, or a linear accelerometer. An integral number of wavelengths around the light beam cavity path of the inertial system is required to produce oscillation. As illustrated, four frequencies of oscillation $w_{LA}$, $w_{LC}$, $w_{RC}$, and $w_{RA}$ are produced by the sensor.

The frequencies $w_{LA}$ and $w_{LC}$ are produced by left-hand circularly polarized beams, with the beam having the frequency $w_{LC}$ propagating in the clockwise direction and the wave having the frequency $w_{LA}$ propagating in the counter-clockwise direction. The frequencies $w_{RC}$ and $w_{RA}$ are produced by right-hand circularly polarized beams, with the beam corresponding to the frequency $w_{RA}$ propagating in the counter-clockwise or anti-clockwise direction, while the beam corresponding to the frequency $w_{RC}$ propagating in the clockwise direction.

The curve 10 will hereinafter be assumed to be symmetrical about a central axis passing through its center or maximum gain frequency wc. Thus, the power amplitudes $A_{LA}$ and $A_{LC}$ corresponding to the frequencies $w_{LA}$ and $w_{LC}$ are respectively symmetrical to the power amplitudes $A_{RA}$ and $A_{RC}$ with respect to the central axis.

As will be described later in greater detail, the cavity length control apparatus of the present invention causes the inertial sensor to operate at a substantially maximum power gain, and causes the lock-in of such maximum gain. In this regard, and for the purpose of retaining a maximum overall output power gain for the inertial sensor, the clockwise propagating beams corresponding to the frequencies $w_{LC}$ and $w_{RC}$ are mixed and processed. It should be understood, however, that the counter-clockwise propagating beams corresponding to the frequency $w_{LA}$ and $w_{RA}$ can be alternatively mixed and processed. However, only two modes are needed to accurately control the cavity length of the inertial sensor.

Figure 2:
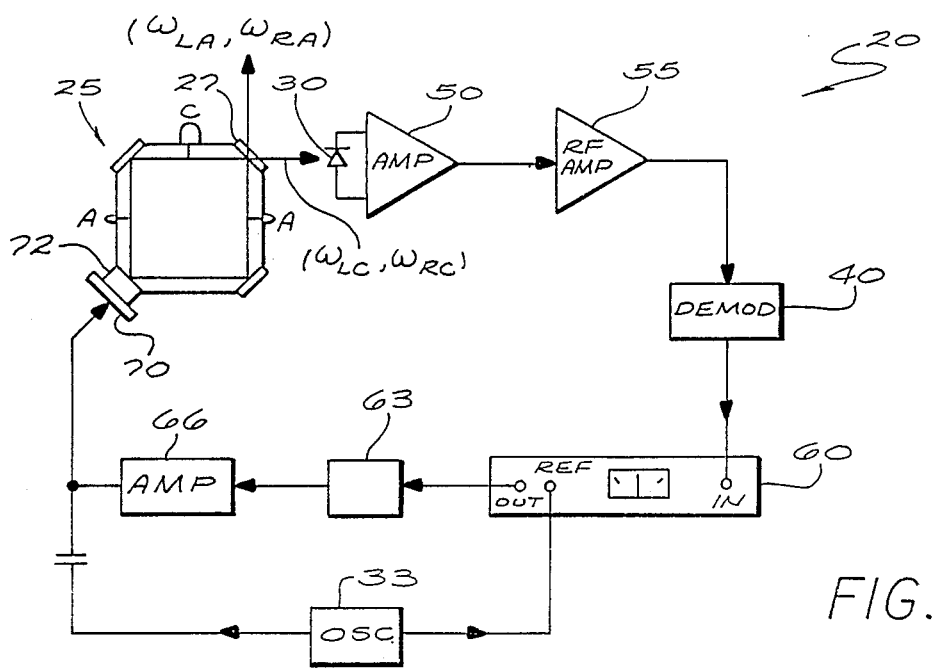
FIG. 2 is a diagrammatic view of a cavity length control apparatus in use with a multioscillation inertial sensor, in accordance with the present invention.

FIG. 2 is a diagrammatic view of a control apparatus 20, according to the present invention, that is used in conjunction with a multioscillation mode inertial sensor 25 for controlling accurately the length of the latter's internal cavity path. The clockwise propagating beams corresponding to the frequencies $w_{LC}$ and $w_{RC}$ exit through a partially transmissive mirror 27 and are then mixed by a PIN or avalanche photodiode 30. The clockwise LCP beam signal $S_{LC}$ and the clockwise RCP beam signal $S_{RC}$ can be expressed by the following equations (1) and (2) respectively, in terms of the amplitudes $A_{LC}$, $A_{RC}$, and the angular frequencies $w_{LC}$, $w_{RC}$, as a function of time:

$$S_{LC} = A_{LC} \cdot \cos w_{LC} t \quad (1)$$

$$S_{RC} = A_{RC} \cdot \cos w_{RC} t \quad (2)$$

The mixing of the two beam signals $S_{LC}$ and $S_{RC}$ results in the following clockwise signal Sc, which is generated at the output of the photodiode 30, and which is expressed by the following equations (3) through (5):

$$Sc = S_{LC} \cdot S_{RC} \quad (3)$$

$$Sc = (A_{LC} \cdot \cos w_{LC} t)(A_{RC} \cdot \cos w_{RC} t) \quad (4)$$

$$Sc = \tfrac{1}{2} A_{LC} A_{RC} [\cos(w_{LC} - w_{RC})t + \quad (5)$$

However, the sum of the two frequencies $w_{LC}$ and $w_{RC}$ is substantially too high to be detected by the photodiode 30, and therefore the signal Sc can be approximated by a signal $S_{C1}$, as expressed in the following equation (6):

$$S_{C1} = \tfrac{1}{2} A_{LC} A_{RC} [\cos(w_{LC} - w_{RC})t] \quad (6)$$

The signal $S_{C1}$ is modulated by a mirror dithering signal ($A \cdot \cos w_m t$) which is produced by an oscillator 33. The dithering frequency wm ranges between about one (1) KHz and ten (10) KHz. However, the preferred frequency is about four (4) KHz. The signal SCD, including dither modulation, is expressed by equation (7) as follows:

$$S_{CD} = \tfrac{1}{2}(A_{LC} + A'_{LC} \cdot A \cdot \cos w_m t) \cdot (A_{RC} + A'_{RC} \cdot A \cdot \cos w_m t) \cdot [\cos(w_{LC} t + w_{RC} t + 2 \cdot M_f \cdot \sin w_m t) + \cos(w_{LC} t - w_{RC} t)] \quad (7)$$

Where A is the amplitude of dithering, $w_m$ is the angular frequency of dithering: $A'_{LC}$ is the derivative of $A_{LC}$ with respect to the amplitude ($dA_{LC}/dA$); $A'_{RC}$ is the derivative of $A_{RC}$ with respect to the amplitude ($dA_{RC}/dA$); and $M_f$ is the FM modulation index for the four modes.

As can be noticed from equation (7), the term $$S_{CD} = \tfrac{1}{2}(A_{LC} + A'_{LC} \cdot A \cdot \cos w_m t) \cdot A_{RC} + A'_{RC} \cdot A \cdot \cos w_m)$$

is the amplitude modulation term, while the term $\cos(w_{LC} t + w_{RC} t + 2 \cdot M_f \sin w_m t)$ is the frequency modulation term. Thus, after demodulating the signal $S_{CD}$ by means of an amplitude demodulator 40, only the amplitude modulation term remains, and the demodulated signal $S_{DD}$ can be expressed in equation (8) and (9) as follows:

$$S_{DD} = (A_{LC} + A'_{LC} \cdot A \cdot \cos w_m t) \cdot (A_{RC} + A'_{RC} \cdot A \cdot \cos w_m t) \quad (8)$$

$$S_{DD} = A_{LC} A_{RC} + (A_{LC} A'_{RC} + A_{RC} A'_{LC}) \cdot A \cdot \cos(w_m t) + \tfrac{1}{2} A'_{LC} A'_{RC} A^2 (1 + \cos 2 w_m t). \quad (9)$$

Therefore, as can be seen from equation (9), the signal $S_{DD}$ has a maximum value when the term ($A_{LC} \cdot A'_{RC} + A_{RC} \cdot A'_{LC}$) is equal to zero. However, such term is the derivative of the term $A_{LC} \cdot A_{RC}$ with respect to the amplitude as indicated by the following equation (10):

$$d/da\, (A_{LC} A_{RC}) = (A_{LC} A'_{RC} + A_{RC} A'_{LC}). \quad (10)$$

The maximum value of the signal $S_{DD}$ corresponds to the maximum amplitude of the clockwise rotating LCP and RCP amplitudes $A_{LC}$ and $A_{RC}$ respectively. Thus, as also illustrated by the power gain curve 10 in FIG. 1, the optimum values of $A_{LC}$ and $A_{RC}$ correspond to points 45 and 47 on the curve 10, where the slopes of the curve are equal in magnitude but opposite in signs.

The mixed signal at the output of the photodiode 30 is passed through a high frequency transimpedance amplifier 50 and an RF amplifier 55, before being transmitted to an RF spectrum analyzer. The demodulated signal at the output of the amplitude demodulator 40 is connected to the input of a lock-in amplifier 60, which detects the error (i.e. $\cos w_m t$ term) and amplifies it. The amplified signal at the output of the lock-in amplifier 60 is fed into an integrator 63, and then into a high voltage amplifier 66, for locking in the sensor 25 at its maximum gain operation. The amplified signal is fed into a piezotransducer 70, which causes a mirror 72, other than the exit mirror 27 to be locked at a predetermined position, and to be dithered at the dithering frequency wm supplied by the oscillator 33.

Figure 3:
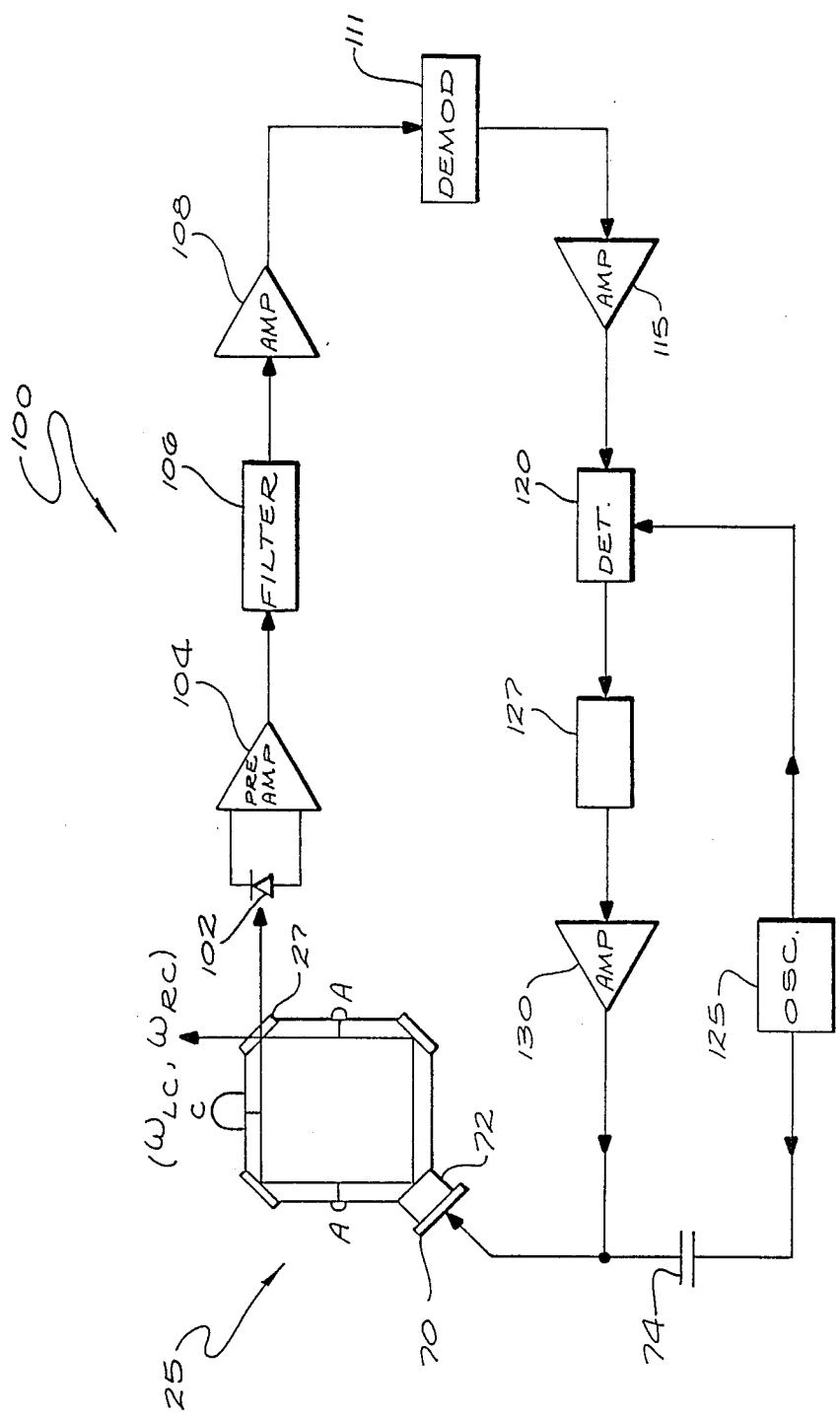
FIG. 3 is a diagrammatic view of another embodiment of a cavity length control apparatus in accordance with the present invention.

Turning now to FIG. 3, there is illustrated another cavity length control apparatus 100 which is constructed in accordance with the present invention. The apparatus 100 is similar to the apparatus 20 illustrated in FIG. 2 and includes a pin or avalanche photodiode 102 which mixes the clockwise propagating beams at the output of the exit mirror 27. The mixed signal at the output of the photodiode 102 is passed through a high frequency preamplifier 104 through a reciprocal frequency bandpass filter 106 and through an RF amplifier 108. The signal at the output of the amplifier 108 is then demodulated by means of an amplitude demodulator 111, and is then fed into a low frequency bandpass amplifier 115 before being detected by a low frequency synchronous detector 120. The reference signal is provided to the detector 120 by an oscillator 125, and is also connected to the piezotransducer 70 and to the dithered mirror 72 through a capacitor 74.

The net error signal at the output of the synchronous detector 120 is integrated by an active integrator 127, before being amplified by a piezotransducer voltage amplifier 130 for connection to the piezotransducer 70.

Thus, both of the cavity length control apparatus described herein are relatively less expensive and less complicated than the existing control devices which utilize optical components and polarizers. Furthermore, the present cavity length control apparatus includes a feedback system which automatically adjusts the length of the cavity path for precise control of the multioscillation mode inertial sensors regardless of the out-of-planeness or non-planar angle of the multioscillator.

What is claimed is:

1. An apparatus for controlling the length of a multioscillator cavity which sustains a substantially left circularly polarized pair of counter propagating beams of light and a substantially right circularly polarized pair of counter propagating beams of light comprising in combination:
   (a) means for mixing beams that propagate in a first direction, one of said beams being substantially left circularly polarized and the other being substantially right circularly polarized;
   (b) means for sinusoidally modulating the amplitudes of said beams at a modulating frequency $\omega_m$;
   (c) means for detecting the amplitude modulation of said mixed beam pair;
   (d) means for detecting the amplitude component of said amplitude modulation at frequency $\omega_m$;
   (e) means for adjusting the length of said cavity in response to said amplitude modulation component at frequency $\omega_m$.

2. An apparatus as defined in claim 1 wherein said means for mixing includes a PIN photodiode.

3. An apparatus as defined in claim 1 wherein said means for mixing includes an avalanche type photodiode.

4. An apparatus as defined in claim 2 wherein said means for modulating includes an oscillator.

5. An apparatus as defined in claim 4 wherein said oscillator provides a modulation frequency ranging between one (1) KHz and ten (10) KHz.

6. An apparatus as defined in claim 5 wherein said modulation frequency is about 4 KHz.

7. An apparatus as defined in claim 5 wherein said means for detecting includes a lock-in amplifier.

8. An apparatus as defined in claim 5 wherein said means for detecting includes a low frequency synchronous detector.

9. An apparatus as defined in claim 8 wherein said means for adjusting includes an active integrator.

10. An apparatus as defined in claim 5 further including a high frequency transimpedance amplifier connected between said photodiode and said means for detecting the amplitude modulation.

11. An apparatus as defined in claim 10 further including a radio frequency amplifier connected between said high frequency transimpedance amplifier and said means for detecting the amplitude modulation.

12. An apparatus as defined in claim 11 further including a high voltage amplifier connected between said means for adjusting the length and the multioscillator.

13. An apparatus as defined in claim 12 further including a reciprocal frequency bandpass filter connected between said high frequency amplifier and said radio frequency amplifier.

14. An apparatus as defined in claim 1 further including a low frequency bandpass amplifier.

15. An apparatus as defined in claim 14 wherein said means for controlling includes a piezotransducer.

16. A method for controlling cavity length in a multioscillator which sustains a substantially left circularly polarized pair of counter propagating beams of light and a substantially right circularly polarized pair of counter propagating beams of light, comprising the steps of:
   (a) sinusoidally modulating the amplitudes of said beams within said cavity at a modulation frequency of $\omega_m$; then
   (b) mixing beams that propagate in a first direction after exiting said cavity, one of said beams being substantially left circularly polarized and the other being substantially right circularly polarized; then
   (c) detecting the amplitude modulation of said mixed beam; then
   (d) detecting the amplitude component of said amplitude modulation at frequency $\omega_m$; and then
   (e) adjusting the length of said cavity in response to the magnitude of the component of said amplitude modulation at frequency $\omega_m$.

* * * * *